US012729812B2

(12) United States Patent
Nagai

(10) Patent No.: US 12,729,812 B2
(45) Date of Patent: Sep. 8, 2026

(54) GAS FILLING DEVICE

(71) Applicant: TATSUNO CORPORATION, Tokyo (JP)

(72) Inventor: Katsumi Nagai, Tokyo (JP)

(73) Assignee: TATSUNO CORPORATION, Tokyo (JP)

( * ) Notice: Subject to any disclaimer, the term of this patent is extended or adjusted under 35 U.S.C. 154(b) by 0 days.

(21) Appl. No.: 19/227,065

(22) Filed: Jun. 3, 2025

(65) Prior Publication Data

US 2026/0002641 A1 Jan. 1, 2026

(30) Foreign Application Priority Data

Jun. 27, 2024 (JP) ................................ 2024-103660

(51) Int. Cl.
*F17C 5/00* (2006.01)

(52) U.S. Cl.
CPC ........ *F17C 5/007* (2013.01); *F17C 2205/037* (2013.01); *F17C 2221/012* (2013.01); *F17C 2265/065* (2013.01)

(58) Field of Classification Search
CPC .... B67D 7/04; B67D 7/40; B67D 2007/0419; F17C 2270/0139; F17C 2205/0376
See application file for complete search history.

(56) References Cited

U.S. PATENT DOCUMENTS 2,744,788 A * 5/1956 Grise ...................... B67D 7/40 242/380
5,727,765 A * 3/1998 Alvern .................... B67D 7/32 248/329

FOREIGN PATENT DOCUMENTS

JP 2020133825 A 8/2020
JP 7177654 B2 11/2022

OTHER PUBLICATIONS

JP2020133825 and English Translation (Year: 2026).*
JP7177654 and English Translation (Year: 2026).*
European Search Report for Application No. 25181937.1-1015; Mailed Oct. 31, 2025.

* cited by examiner

*Primary Examiner* — Timothy P. Kelly
(74) *Attorney, Agent, or Firm* — Stetina Garred Brucker & Newboles

(57) ABSTRACT

To provide a gas filling device that can effectively prevent the infiltration of rainwater with a simple structure. A gas filling device 1 of the present invention including: a filling mechanism for transporting gas from a gas supply source through a gas pipe; a main body housing 2 having the filling mechanism therein; a filling hose 3 connected to an outlet of the gas pipe of the filling mechanism; and a support arm mechanism 6 for supporting, via a wire 5, a filling nozzle 4 provided at a tip of the filling hose 3, a mechanical winding device 9 provided at an end of the support arm mechanism 6; and a guide provided at another end of the support arm mechanism 6 for guiding a wire 5A led out from the mechanical winding device 9 to an opening 6BC formed in a lower cover 6B of the support arm mechanism 6. It is preferable that the guide is provided with a reeling roller 11A that sends the wire 5A from the mechanical winding device 9 to an opening 6BC, and a holding roller 11B that restricts the wire 5A from moving upward, and the wire 5A is sandwiched between the reeling roller 11A and the holding roller 11B.

8 Claims, 14 Drawing Sheets

【Fig.1】
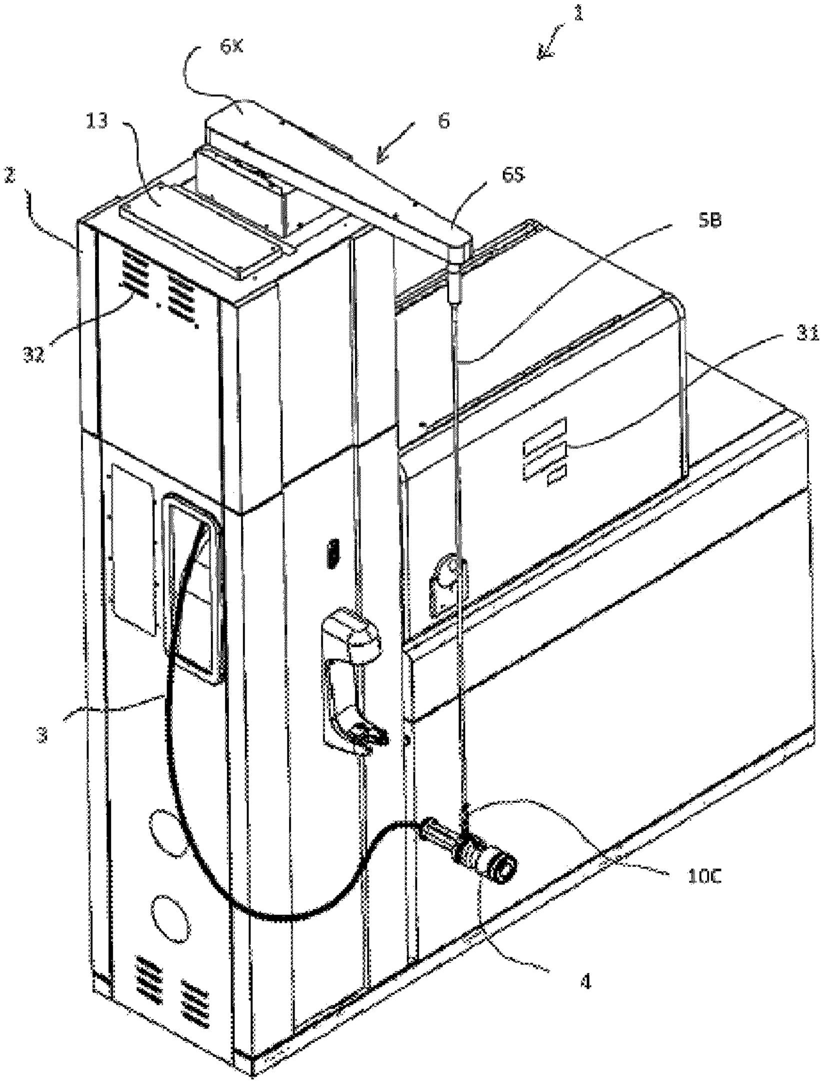

【Fig.2】
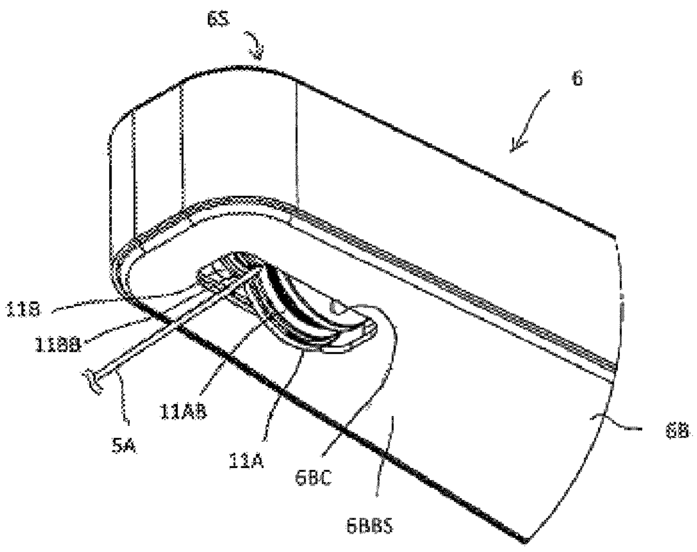
【Fig.3】
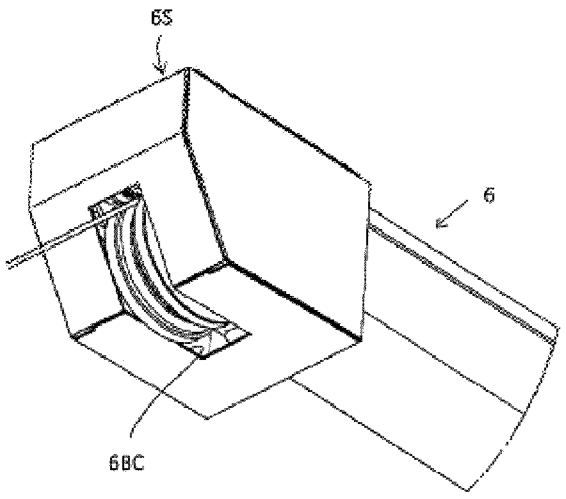

【Fig.4】
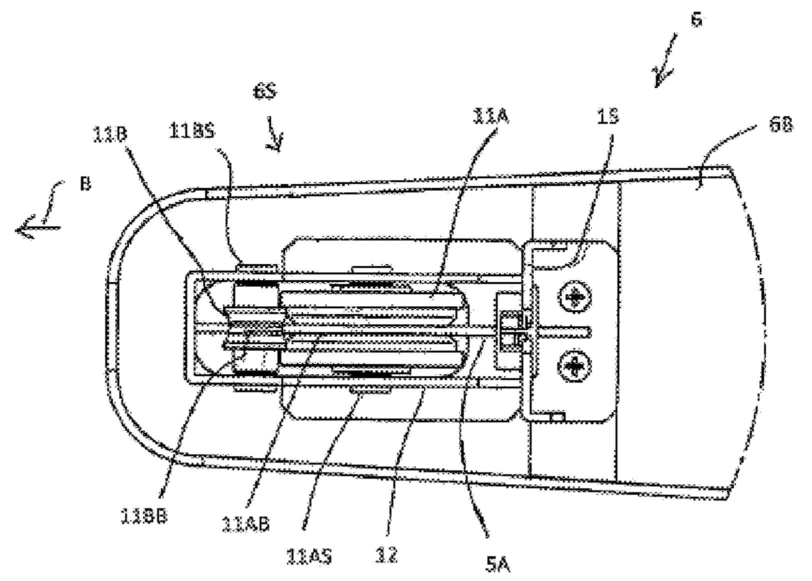
【Fig.5】
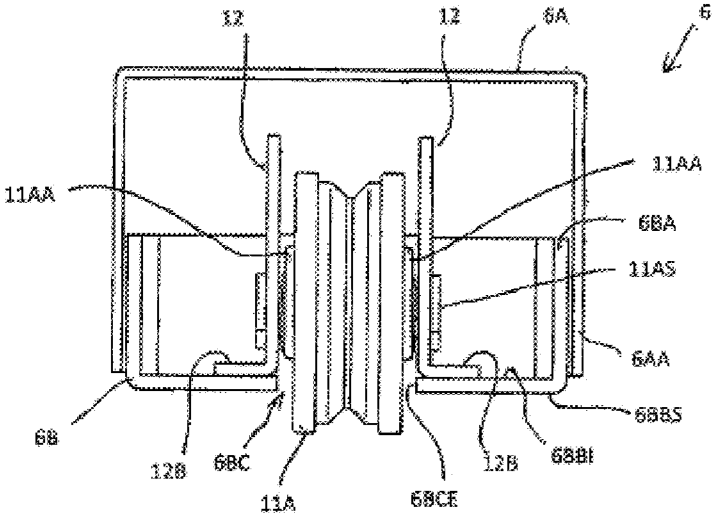

【Fig.6】
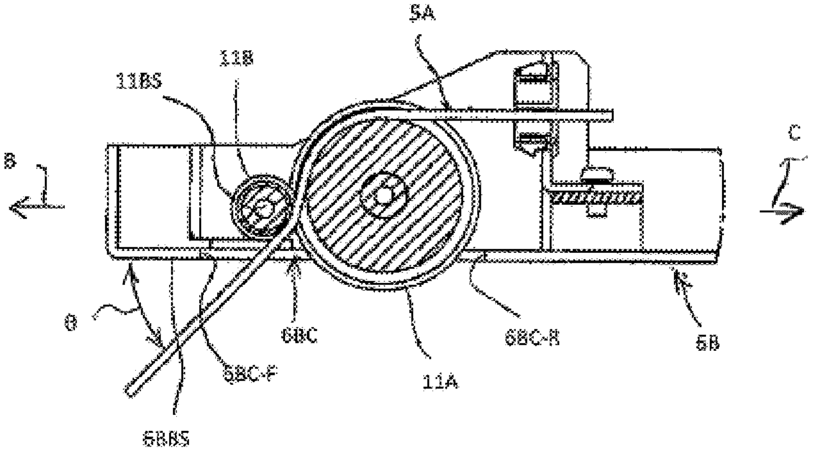
【Fig.7】
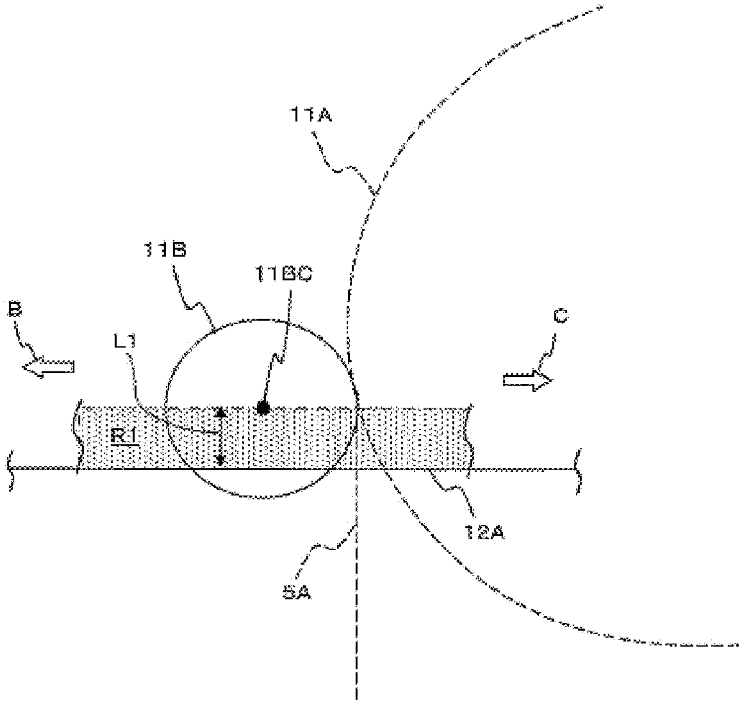

【Fig.8】
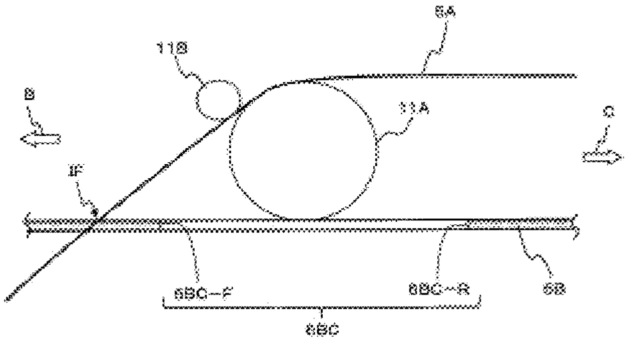

【Fig.9】
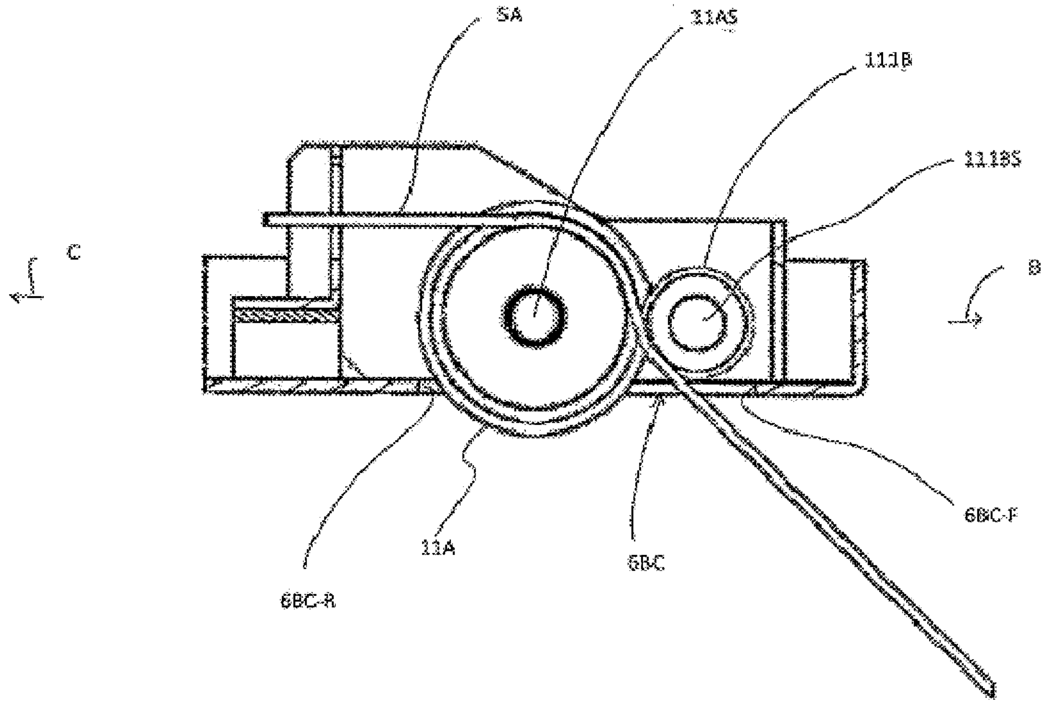

【Fig.10】
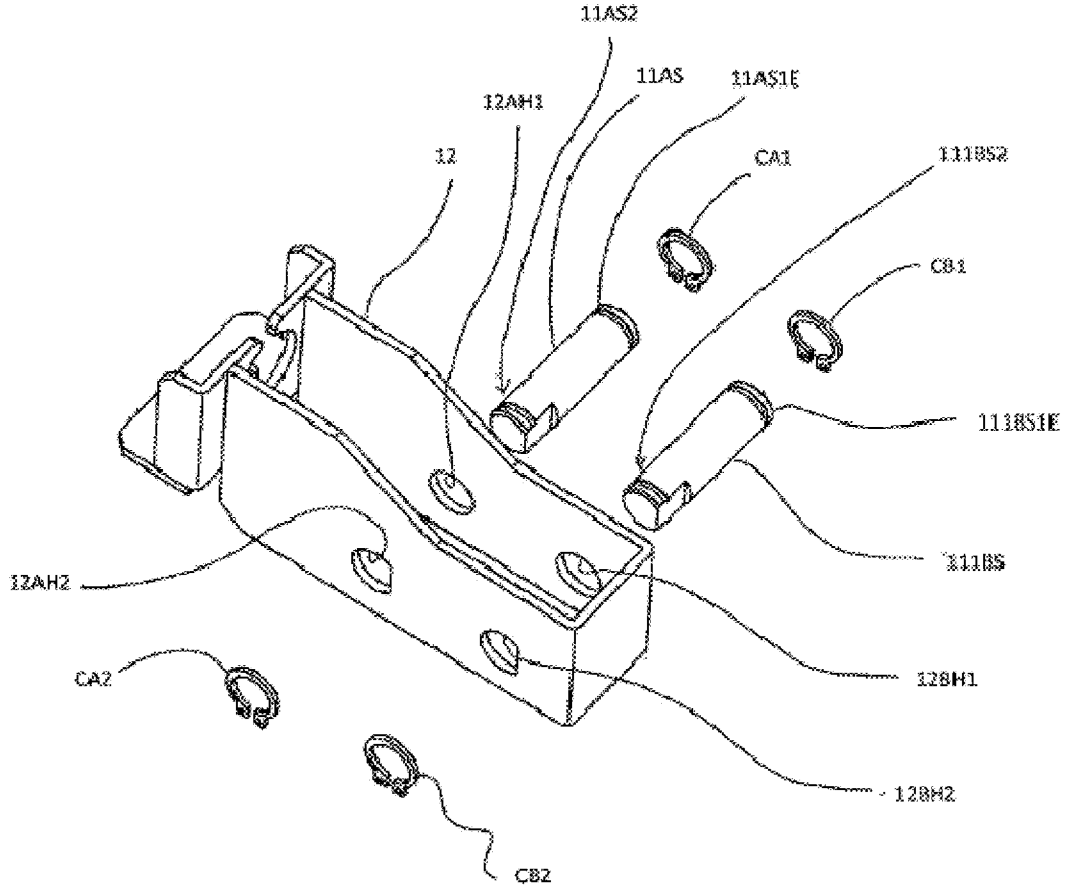

【Fig.11】
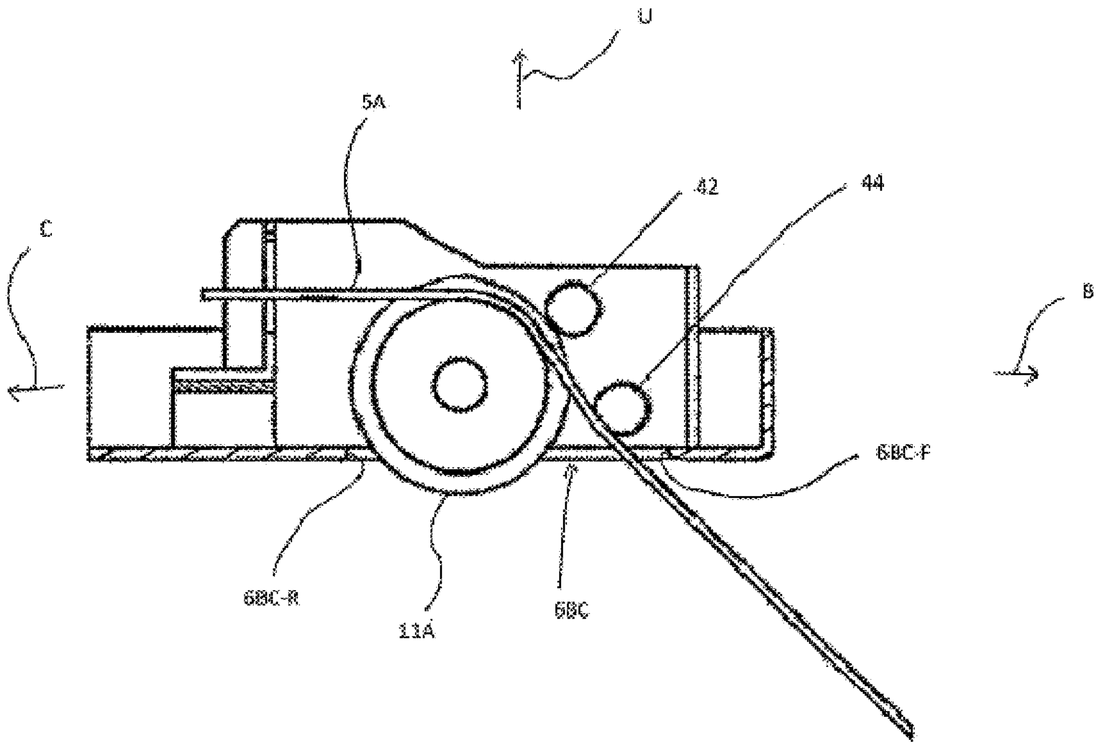

【Fig.12】
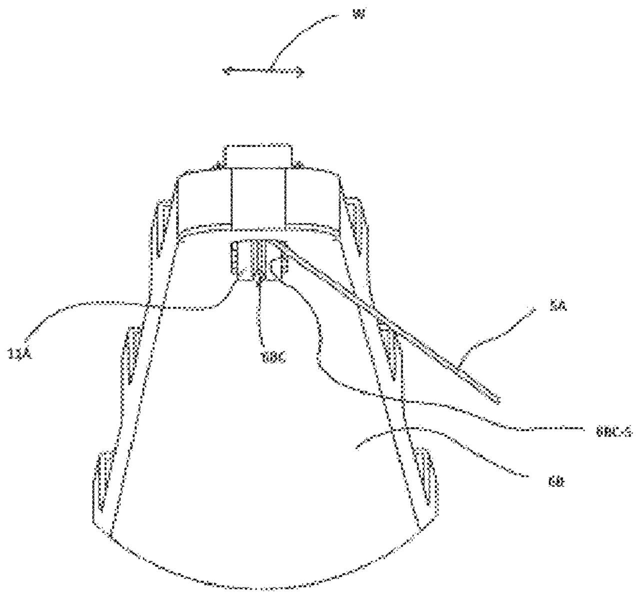
【Fig.13】
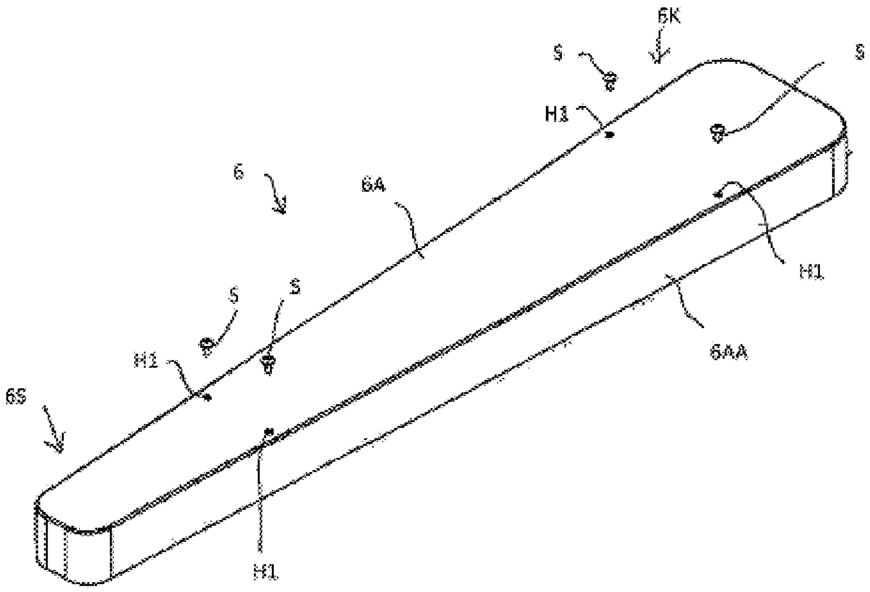

【Fig.14】
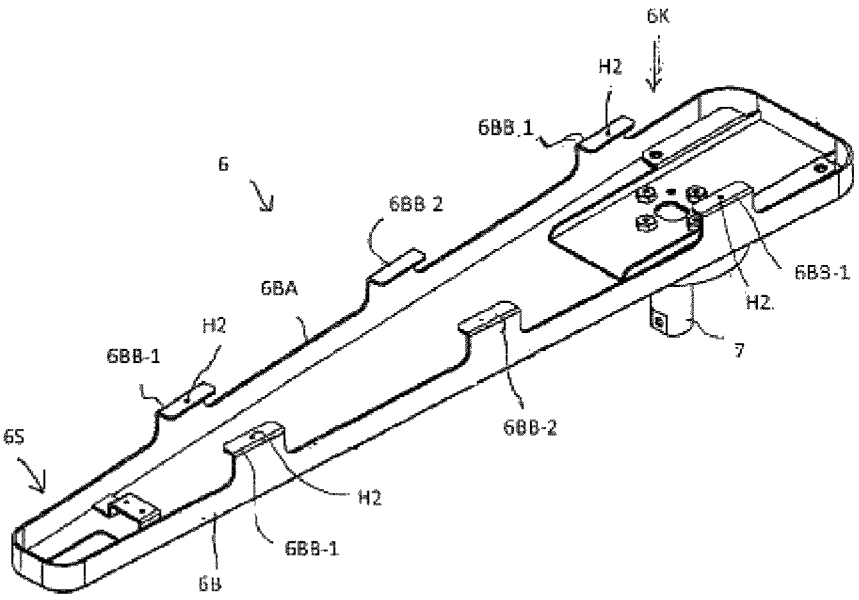
【Fig.15】
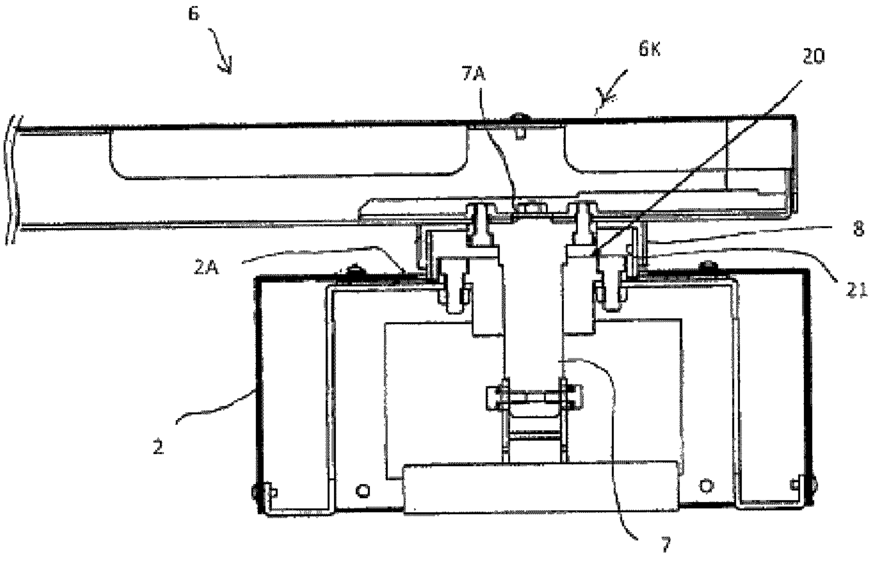

【Fig.16】
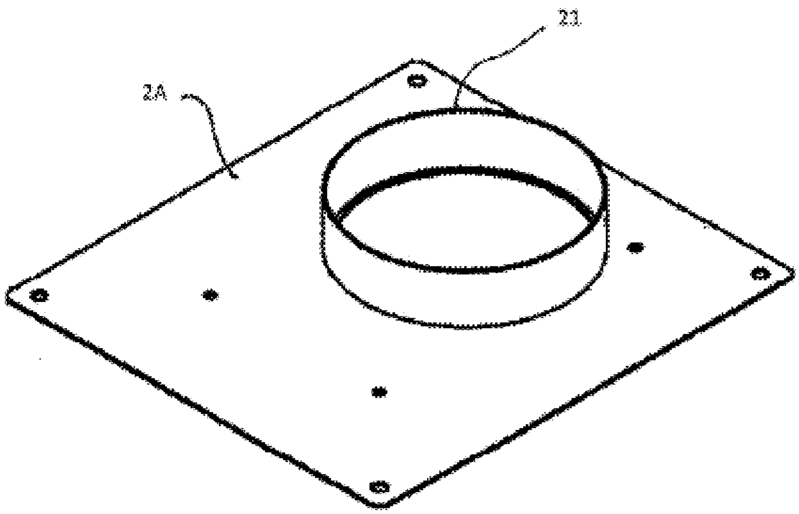

【Fig.17】
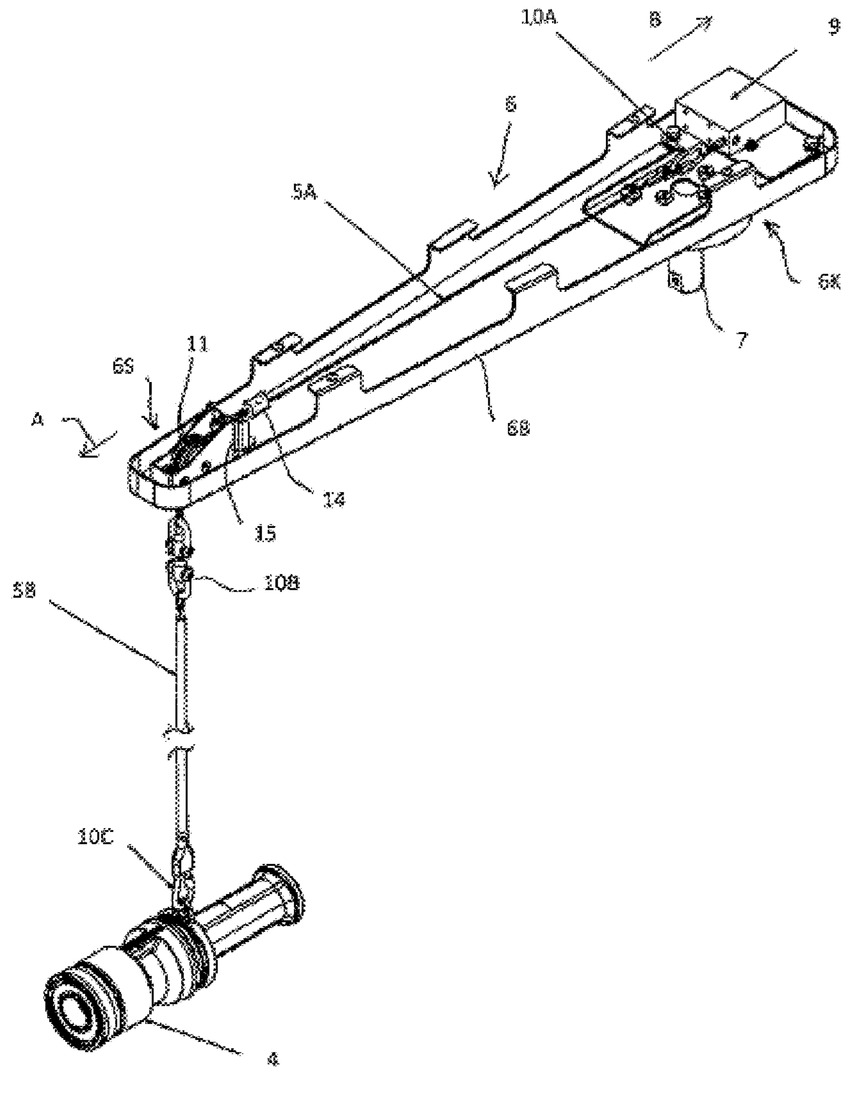

【Fig.18】
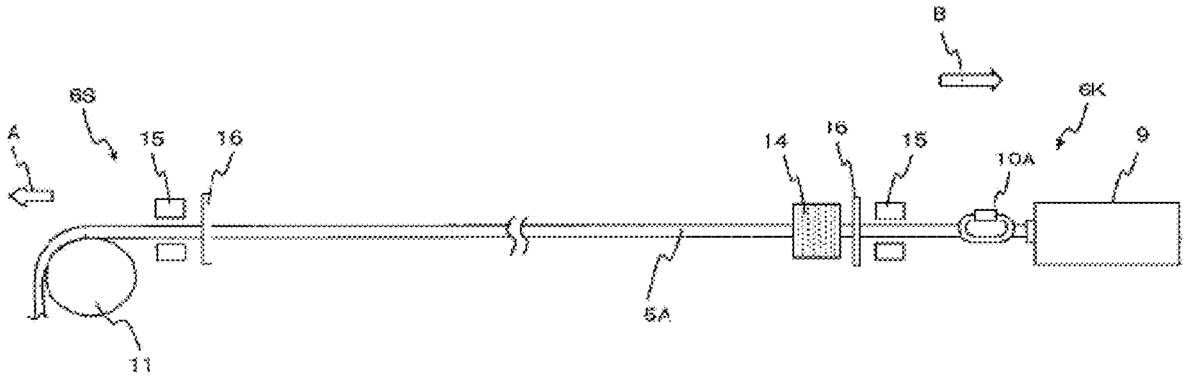

【Fig.19】
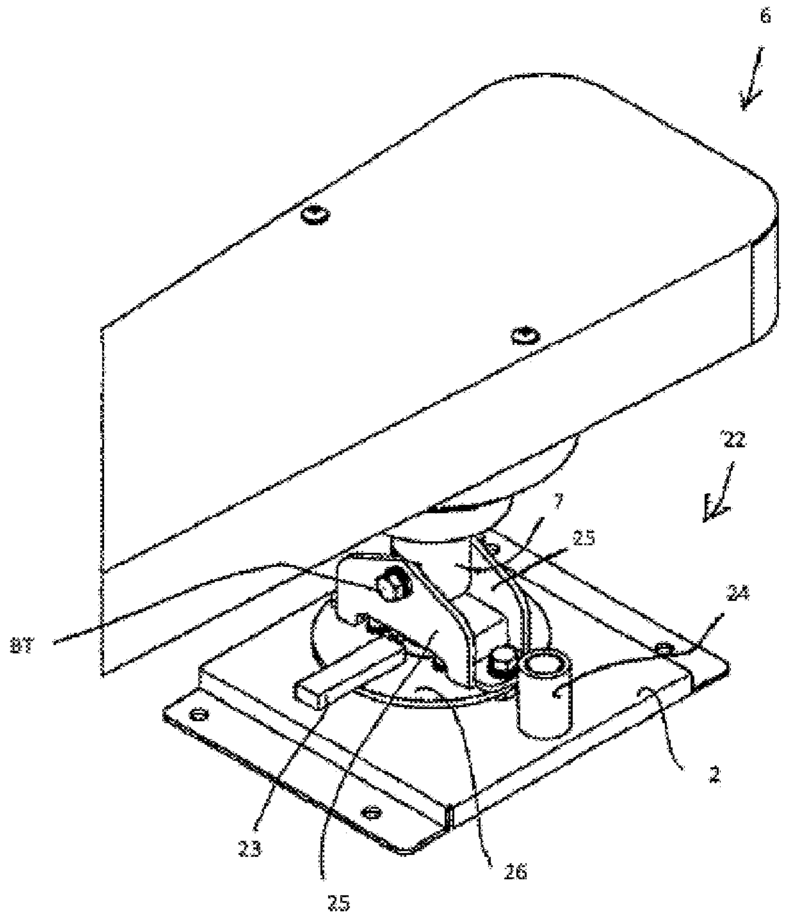

GAS FILLING DEVICE

CROSS-REFERENCE TO RELATED APPLICATIONS

The present application claims priority to Japanese Patent Application No. 2024-103660 filed on Jun. 27, 2024, the disclosure of which is incorporated herein by reference.

STATEMENT RE: FEDERALLY SPONSORED RESEARCH/DEVELOPMENT

Not Applicable

BACKGROUND

1. Field of the Invention

The present invention relates to a gas filling device for supplying gas such as hydrogen gas to an FCV or the like, and in particular to a support mechanism thereof.

2. Description of the Related Art

Hydrogen has various advantages such as being environmentally friendly and contributing to energy security, and technologies for utilizing hydrogen gas are being rapidly put into practical use. One of the applications of hydrogen gas is a technology related to a gas filling device that fills hydrogen gas pressurized to a high pressure (e.g., 70 MPa or more) into a fuel tank of a vehicle. The filling nozzle of the gas filling device is sturdy so that it can withstand the high pressure described above. However, since the filling nozzle is heavy, the work of removing the filling nozzle from the gas filling device and connecting it to a receptacle of the vehicle to fill the hydrogen gas is a heavy burden for the worker.

In recent years, self-service hydrogen stations have been developed, and a support arm mechanism has been proposed that allows customers to fill gas themselves with light work by supporting the filling nozzle with a support mechanism (see, for example, JP2020-133825A gazette). Although this technology is effective, a wire is guided with a guide roller 39 that restricts the lateral movement of the wire and a guide roller 36 that guides the wire downward, so that the structure is complicated and the labor required for assembly is large. Also, if rainwater accumulates above a connector 38A, when the connector 38A abuts against a stopper 37, the rainwater will enter a nozzle hanging device, causing it to malfunctions and hindering the filling work.

The content of JP2020-133825A gazette is incorporated herein by reference in its entirety.

BRIEF SUMMARY

The present invention has been proposed in view of the problems of the prior art described above, and an object thereof is to provide a gas filling device that can effectively prevent the infiltration of rainwater with a simple structure.

A gas filling device 1 of the present invention is characterized by including a filling mechanism that transports gas from a gas supply source through a gas pipe, a main body housing 2 that houses the filling mechanism, a filling hose 3 that is connected to the outlet of the gas pipe of the filling mechanism, a support arm mechanism 6 that supports a filling nozzle 4 at a tip of the filling hose 3 via wires 5A and 5B, a mechanical winding device (retractor) 9 at one end of the support arm mechanism 6, and a guide member at another end of the support arm mechanism 6 that guides the wire 5A led out from the mechanical winding device 9 to an opening 6BC formed in a lower cover 6B of the support arm mechanism 6.

In the present invention, the guide member preferably includes a reeling roller (large roller) 11A that feeds the wire 5A from the mechanical winding device 9 to the opening 6BC, and a holding roller (small roller) 11B that restricts the upward movement of the wire 5A, and the reeling roller 11A and the holding roller 11B sandwich the wire 5A. Here, it is preferable that the movement range of the wire 5A is within the range of the opening 6BC of a bottom surface 6BBS of the lower cover 6B (within a range that does not interfere with the opening 6BC).

In addition, the reeling roller and the holding roller are supported by a roller retaining bracket, and the distance from the center of the rotation axis of the holding roller to the lower edge of the roller support bracket is preferably a distance that ensures the strength to reliably support the load acting on the holding roller by the roller support bracket. In this case, the direction in which the wire 5A sandwiched between the reeling roller 11A and the holding roller 11B extends is preferably the region between a front edge 6BC-F and a rear edge 6BC-R of the opening 6BC. In addition, it is preferable that the outer surface of the reeling roller 11A is provided with a stepped portion that protrudes outward (a large roller side edge protrusion 11AA is formed).

The diameter of the holding roller (small roller) 111B is preferably set to a dimension such that the wire 5A and the arc of the outer periphery of the holding roller 111B make line contact without making point contact. Moreover, the guide member is provided with a roller member 11, and the roller member 11 preferably has a reeling roller 11A that feeds the wire 5A from the mechanical winding device 9 to the opening 6BC, a first shaft 42 that is provided at a position that prevents the wire 5A from moving upward (floating up), and a second shaft 44 that can guide the wire 5A to the opening 6BC and is provided at a position that does not cause the wire 5A to interfere with the opening front edge 6BC-F.

In addition, in the present invention, a mechanical winding device 9 that pays out and winds up the wires 5A and 5B is provided inside the support arm mechanism 6, and the wire 5A paid out from the mechanical winding device 9 and the wire 5B that supports the filling nozzle 4 are preferably connected by a connecting member (carabiner) 10B.

In the gas filling device 1 of the present invention, the support arm mechanism 6 is preferably composed of an upper cover 6A having a first bent portion 6AA formed around the entire circumference facing downward, and a lower cover 6B having a second bent portion 6BA formed facing upward, and the second bent portion 6BA is preferably located on the inner surface of the first bent portion 6AA.

In that case, it is preferable that the second bent portion 6BA is provided with tall guide portions 6BB intermittently, and the guide portions 6BB abut against the inner surface of the upper cover 6A. And, it is preferable that the guide portions 6BB have fastening guides 6BB-1 that are fastened to the upper cover 6A, and reinforcing guides 6BB-2 that suppress bending of the support arm mechanism 6 in the longitudinal direction.

Furthermore, in the present invention, the support arm mechanism 6 is arranged to be rotatable relative to the main body housing 2, and is provided with a cylindrical portion 8 that leads to an opening in which the rotation shaft 7 at one end of the support arm mechanism 6 is arranged, and a rising part 21 formed on the upper part of the main body housing 2, and it is preferable that the rising part 21 is located on the inner surface of the cylindrical portion 8.

According to the present invention having the above-mentioned configuration, the wire 5 led out from the mechanical winding device 9 of the support arm mechanism 6 is guided to the opening 6BC formed in the lower cover 6B by the guide roller 11A that sends the wire 5 from the mechanical winding device 9 to the opening 6BC, and the holding roller 11B that restricts the upward movement of the wire 5. By sandwiching the wire 5A between the guide roller 11A and the holding roller 11B, the movement range of the wire 5A is limited to the opening 6BC on the lower surface of the lower cover 6B, and the wire 5A does not interfere with the opening 6BC on the lower surface of the lower cover 6B. Since the wire 5A does not interfere with the opening 6BC, it is no longer necessary for the opening 6BC to extend to the tip of the support arm mechanism 6, and rainwater is reliably prevented from entering the inside of the support arm mechanism 6 from the tip of the support arm mechanism 6 at the opening 6BC. In addition, by arranging the mechanical winding device side wire 5A in such a manner that it is sandwiched between the reeling roller 11A and the holding roller 11B, the mechanical winding device side wire 5A is prevented from coming off the reeling roller 11A and the holding roller 11B. And, since the opening 6BC does not need to extend to the tip of the support arm mechanism 6, the length of the opening 6BC, particularly the length in the direction of the tip of the support arm mechanism 6, can be shortened.

In the present invention, the reeling roller 11A and the holding roller 11B are supported by the roller holding bracket 12, and the distance L1 from the axis 11BC of the rotation shaft 11BS of the holding roller 11B to the lower edge 12A of the roller support bracket 12 is set to a distance that ensures the strength that the roller support bracket 12 can reliably support the load acting on the holding roller 11B, so that the roller support bracket 12 is prevented from being deformed or damaged by the tension acting on the wire. If the wire 5 sandwiched between the reeling roller 11A and the holding roller 11B extends in the region between the opening front edge 6BC-F and the opening rear edge 6BC-R, the mechanical winding device side wire 5A sandwiched between the reeling roller 11A and the holding roller 11B passes through the opening 6BC without interfering with the opening 6BC and is fed out and wound up. Since the mechanical winding device side wire 5A does not interfere with the opening 6BC, the support arm mechanism 6 and the wire 5B can fully support the filling nozzle 4 no matter how the filling nozzle 4 moves during gas filling work, etc.

In addition, in the present invention, if a stepped processing protruding outward is applied to the outer surface of the reeling roller 11A (if a reeling roller side edge protrusion 11AA is formed), the side of the reeling roller 11A is prevented from contacting or interfering with the roller support bracket 12. It also prevents the side of the reeling roller 11A from interfering with an inner edge 6BCE of the opening 6BC.

Furthermore, the mechanical winding device 9 that pays out and winds up the wires 5A and 5B is provided inside the support arm mechanism 6, and if the wire 5A paid out from the mechanical winding device 9 and the wire 5B that supports the filling nozzle 4 are connected by a connecting member 10B, then if a problem occurs with the mechanical winding device 9 or the wire 5A, it is possible to replace only the wire 5A or the attached member between the connecting members 10B without replacing the entire member attached to the wire 5A, making part replacement easy.

BRIEF DESCRIPTION OF THE DRAWINGS

FIG. 1 is an overall perspective view showing an embodiment of a gas filling device according to the present invention.

FIG. 2 is a perspective view showing an opening for passing a wire on a mechanical winding device side provided in a bottom surface of a lower cover at a tip of an arm, and a roller provided in the opening.

FIG. 3 is a perspective view showing a conventional configuration in which the opening shown in FIG. 2 is provided at the tip of the arm.

FIG. 4 is a plan view showing the arrangement of rollers at the tip of the arm according to the first embodiment of the present invention.

FIG. 5 is a plan view showing the arrangement of rollers in the first embodiment.

FIG. 6 is a side view showing the relative positional relationship between a large roller and a small roller in the first embodiment.

FIG. 7 is a schematic diagram showing conditions for the relative positional relationship between the large roller and the small roller in the first embodiment.

FIG. 8 is a schematic diagram showing conditions for the relative positional relationship between the large roller and the small roller in the first embodiment, and is a view different from FIG. 7.

FIG. 9 is a schematic diagram showing the relative positional relationship between a large roller and a small roller in the second embodiment.

FIG. 10 is an exploded perspective view of members other than the rollers shown in FIG. 9.

FIG. 11 is a side view showing the relative positional relationship between a large roller and first and second shafts in the third embodiment.

FIG. 12 is a perspective view showing the opening on the bottom surface at the tip of the arm and the wire on the mechanical winding device side in the third embodiment.

FIG. 13 is a perspective view of an upper cover of the support arm mechanism shown in FIG. 1.

FIG. 14 is a perspective view of the lower cover of the support arm mechanism shown in FIG. 1.

FIG. 15 is a cross-sectional view showing the mounting structure of a base of the support arm mechanism and a top of the gas filling device.

FIG. 16 is a perspective view showing a rising part provided at a connection point between the top of the gas filling device and an arm base.

FIG. 17 is a perspective view showing the wires and related members from the support arm mechanism to the filling nozzle.

FIG. 18 is a schematic diagram of members related to the wire on a mechanical winding device side.

FIG. 19 is a perspective view showing a rotation restricting means below a rotation shaft of the support arm mechanism.

DETAILED DESCRIPTION

Hereinafter, an embodiment of the present invention will be described with reference to the accompanying drawings. In the illustrated embodiment, a gas filling device (dispenser) 1 for filling hydrogen is illustrated. In FIG. 1, the gas filling device (hydrogen filling device) 1 is a device for supplying and filling a fuel gas (e.g., hydrogen gas) pressurized from a gas supply source (not shown) through a gas pipe to, for example, a fuel tank of a fuel cell vehicle (FCV: not shown), and is installed in a facility called a gas supply station. The gas filling device 1 includes a filling mechanism in a main body housing 2, a filling hose 3 is connected to the outlet of a gas pipe (not shown) in the filling mechanism, and a filling nozzle 4 is provided at the tip of the filling hose 3. In the illustrated embodiment, a hydrogen gas filling device is illustrated, but the illustrated embodiment can also be applied to CNG gas and other gas filling devices. The configuration and effects of the filling mechanism (not shown) in the main body housing 2 are similar to those of a conventionally known filling mechanism.

In FIG. 1, a support arm mechanism 6 is provided on the upper surface (top surface) of the main body housing 2. A wire 5B hangs down from a tip 6S of the support arm mechanism 6, and the hanging tip of the wire 5B is connected to the filling nozzle 4 via a connecting member (carabiner) 10C. Although not shown in FIG. 1, the other end of the wire 5B is connected to a mechanical winding device 9 (see FIG. 17) housed in a base 6K of the support arm mechanism 6. The mechanical winding device 9 is provided with a rotational force imparting mechanism that imparts a certain rotational force when a wire reel that winds and unwinds the wire rotates forward or backward. Furthermore, the mechanical winding device 9 is provided with a wire holding mechanism that holds the wire in its position when winding and unwinding of the wire is stopped.

The filling nozzle 4 is suspended with the wire 5B, and the weight of the filling hose 3 and the filling nozzle 4 is supported by the support arm mechanism 6. Therefore, when performing hydrogen filling work using the heavy filling hose 3 and filling nozzle 4, the support arm mechanism 6 supports the weight of the filling hose 3 and the filling nozzle 4, so that the burden on a worker or user performing the gas filling work can be reduced. The configuration including the wire 5 from the mechanical winding device 9 (not shown in FIG. 1) to the filling nozzle 4 will be described later with reference to FIGS. 17 and 18. The support arm mechanism 6 shown in FIG. 1 is composed of an upper cover 6A and a lower cover 6B, and the details thereof will be described later with reference to FIGS. 13 and 14.

In FIG. 1, the support arm mechanism 6 is disposed rotatably relative to the main body housing 2. Although not clearly shown in FIG. 1, a rotation shaft disposed at the base 6K of the support arm mechanism 6 is supported by a bearing on the main body housing 2 side. The mounting structure of the base 6K of the support arm mechanism 6 on the main body housing 2 side will be described later with reference to FIG. 15 and FIG. 16. Rotation restricting means for restricting the rotation of the rotation shaft of the support arm mechanism 6 will be described later with reference to FIG. 19. In FIG. 1, in addition to the support arm mechanism 6, a blast wave release means 13 is disposed on the upper part of the main body housing 2. The blast wave release means 13 is configured to release blast wave in the event of an explosion occurring inside the main body housing 2, and has the function of preventing a situation in which the explosion poses a danger to the user and preventing damage to the main body housing 2 and the components of the gas filling device 1. In FIG. 1, a reference numeral 31 denotes a display in the gas filling device 1, and a reference numeral 32 denotes ventilation slits in the main body housing 2.

In the first embodiment of the present invention described with reference to FIGS. 2 to 8, rollers 11 (large roller 11A, small roller 11B, not shown in FIG. 1) are provided at the tip of the support arm mechanism 6 (FIG. 1) to guide the wire 5A led out from the mechanical winding device 9. In FIG. 2, an opening 6BC is formed in a bottom surface 6BBS of the lower cover 6B at the tip 6S of the support arm mechanism 6. A large roller (reeling roller) 11A and a small roller (holding roller) 11B are arranged inside the support arm mechanism 6 and near the opening 6BC. In FIG. 2, only a part of the large roller 11A and the small roller 11B are shown. The large roller 11A functions as a reeling roller that sends (guides) the wire 5A led out from the mechanical winding device 9 (not shown in FIG. 2: see FIG. 17) arranged on the base 6K side of the support arm mechanism 6 to the opening 6BC. The small roller 11B functions as a holding roller that restricts the mechanical winding device side wire 5A from moving upward.

In FIG. 2, the mechanical winding device side wire 5A is sandwiched between the large roller 11A and the small roller 11B, and extends downward from the opening 6BC (to the filling nozzle 4 side not shown in FIG. 2: see FIGS. 1 and 17 for the filling nozzle 4). A V-shaped groove 11AB is formed in the large roller 11A, and the mechanical winding device side wire 5A extends within the V-shaped groove 11AB. A V-shaped groove 11BB is also formed in the small roller 11B, and the mechanical winding device side wire 5A also extends within the V-shaped groove 11BB. This is to stabilize the unwinding direction of the mechanical winding device side wire 5A and to regulate the movement of the mechanical winding device side wire 5A in a direction perpendicular to the unwinding direction (the direction in which the wire 5A tries to come off the large roller 11A and the small roller 11B: the lateral direction).

In FIG. 2, the opening 6BC is formed only on the bottom surface (lower surface) 6BBS of the lower cover 6B of the support arm mechanism 6, and does not extend to the arm tip 6S. When the opening 6BC extends to the arm tip 6S as shown in FIG. 3, rainwater will enter the support arm mechanism 6. However, when the opening 6BC is formed only on the arm lower surface (bottom surface 6BBS of the lower cover 6B) as shown in FIG. 2, rainwater will not enter the support arm mechanism 6, as confirmed by the inventor by performing a water spray test of the IPX3 standard (waterproof level 3). Note that the hydrogen filling device in which the opening 6BC extends to the arm tip 6S as shown in FIG. 3 relates to the prior art (prior art other than Patent Document 1). To avoid complication, the same reference numerals as those in the illustrated embodiment are used in FIG. 3 for the support arm mechanism 6, the arm tip 6S, the opening 6BC, etc.

In the support arm mechanism 6 of the gas filling device 1 according to the illustrated embodiment, the required range of waterproofing is waterproofing to a degree that is not adversely affected by water spraying from above and water spraying from an angle inclined at 60° to the vertical plane, which corresponds to level 3 of the waterproofing grade in the IPX3 standard. In the inventor's experiment, it was found that by forming the opening 6BC only on the underside of the arm (bottom surface 6BBS of the lower cover 6B) and not extending it to the tip 6S of the support arm mechanism 6, waterproofing performance sufficient to satisfy the waterproofing grade of the IPX3 standard (sufficiently withstands the IPX3 waterproofing test) is exhibited. In the first embodiment, as will be described later with reference to FIGS. 6 and 8, the movement range of the mechanical winding device side wire 5A is within the range of the opening 6BC formed on the bottom surface 6BBS of the lower cover 6B. Therefore, rainwater does not penetrate into the inside of the support arm mechanism 6 along the mechanical winding device side wire 5A. This has also been confirmed in the inventor's experiment. Furthermore, since the opening 6BC does not need to extend all the way to the tip of the support arm mechanism 6, the length of the opening 6BC, particularly the length in the direction of the tip of the support arm mechanism 6, can be shortened accordingly.

FIG. 4 shows the large roller 11A and the small roller 11B at the tip of the support arm mechanism 6 viewed from above. In FIG. 4, the mechanical winding device side wire 5A is arranged so as to be sandwiched between the large roller 11A and the small roller 11B. The small roller 11B is located on the arm tip 6S side (arrow B) with respect to the large roller 11A. Arranging the mechanical winding device side wire 5A so as to be sandwiched between the V-shaped groove 11AB of the large roller 11A and the V-shaped groove 11BB of the small roller 11B allows the mechanical winding device side wire 5A to be prevented from coming off the large roller 11A and the small roller 11B.

In FIG. 4, a rotation shaft 11AS of the large roller 11A and a rotation shaft 11BS of the small roller 11B are supported by a roller support bracket 12. As shown in FIG. 5, the roller support bracket 12 is attached to an inner surface 6BBI of the bottom surface 6BBS of the lower cover 6B via a pedestal portion 12B in a manner that straddles the opening 6BC. In FIG. 4, a reference numeral 15 denotes a stopper against which a washer 16 abuts when pressed by a buffer rubber 14 (not shown). The buffer rubber 14 and the stopper 15 will be described later with reference to FIGS. 17 and 18.

In FIG. 5, a side edge of the large roller 11A is provided with a large roller side edge protrusion 11AA that protrudes outward (in the direction of the central axis of the rotation shaft 11AS, toward both the left and right ends in FIG. 5). In other words, the side edge of the large roller 11A is provided with a step that protrudes outward. Providing the large roller side edge protrusion 11AA prevents the outer surface of the large roller 11A from contacting the roller support bracket 12 or from contacting or interfering with the inner edge 6BCE of the opening 6BC. This prevents the paint film of the relevant part from being removed due to interference with the outer surface of the large roller 11A, which could cause rust. Furthermore, the large roller 11A rotates smoothly without interference.

Next, an example of the relative positional relationship between the large roller 11A and the small roller 11B will be described mainly with reference to FIGS. 6 to 8. As shown in FIG. 6, the mechanical winding device side wire 5A needs to pass through the opening 6BC of the lower cover 6B smoothly, be fed out, and be wound up without interfering with the front edge 6BC-F of the opening 6BC. If the mechanical winding device side wire 5A interferes with the opening 6BC, the coating will peel off, the roller 11 will wear, and the mechanical winding device side wire 5A will not be able to be smoothly wound and fed out, and ultimately, the mechanical winding device side wire 5A may break and be unable to hold the filling nozzle 4.

As described above with reference to FIGS. 4 and 5, the rotation shaft 11BS of the small roller 11B is supported by the roller support bracket 12. As is clear from FIG. 5, the lowermost part of the roller support bracket 12 fixed to the inner surface 6BBI of the bottom surface 6BBS of the lower cover 6B is not lower than the lower cover 6B. In FIG. 7, if the distance L1 from the rotation center 11BC of the small roller 11B (the axis of the rotation shaft 11BS shown in FIG. 6) to the lower edge 12A of the roller support bracket 12 is short, the roller support bracket 12 must support the load (tension acting on the mechanical winding device side wire 5A or other load) applied to the small roller 11B by the region R1 (hatched region in FIG. 7) formed by the short distance L1, but the strength of the region R1 in the roller support bracket 12 becomes insufficient (relative to the strength required to support the small roller 11B), and the region R1 of the roller support bracket 12 may be damaged, making it impossible to support the small roller 11B. Therefore, the distance L1 in the region R1 of the roller support bracket 12 must be set to a level that ensures the necessary and sufficient strength to support the small roller 11B and prevents the region R from being damaged, and must be set to a level that ensures the necessary and sufficient strength to support the small roller 11B. In addition, in FIG. 7, the large roller 11A is shown by a broken line. As is clear from FIG. 7, if the small roller 11B is placed at the bottom (the lower edge 12A side of the roller support bracket 12), the distance L1 becomes smaller. Therefore, the distance L1 from the rotation center 11BC of the small roller 11B to the lower edge 12A of the roller support bracket 12 must be set large so that the region R1 of the distance L1 in the roller support bracket 12 (the region shown by hatching in FIG. 7) can ensure the strength necessary to support the small roller 11B, and the small roller 11B must be positioned above (in FIG. 6 and FIG. 7). For example, the distance L1 is set to 6 mm or more.

On the other hand, as shown in FIG. 8, if the position of the small roller 11B is too far up in FIGS. 6 and 8 and is far from the opening 6BC of the lower cover 6B, the direction in which the mechanical winding device side wire 5A extends becomes the arm tip 6S side (arrow B side in FIGS. 6 and 8), which is an area outside the opening 6BC, and the mechanical winding device side wire 5A interferes with the front edge 6BC-F of the opening 6BC or the area on the arm tip 6S side from the front edge 6BC-F. In FIG. 8, the area in which the mechanical winding device side wire 5A interferes with a part other than the opening 6BC is shown as a hatched area IF. As described with reference to FIG. 7, when the position of the small roller 11B is too close to the opening 6BC (when the distance L1 is too small), the strength of the area R1 in the roller support bracket 12 may be insufficient to support the small roller 11B. However, as shown in FIG. 8, if the position of the small roller 11B is too far from the opening 6BC (upward in FIG. 8), it will interfere with the front edge 6BC-F of the opening 6BC or the area on the arm tip 6S side from the front edge 6BC-F. Therefore, it is necessary to set the direction in which the mechanical winding device side wire 5A sandwiched between the large roller 11A and the small roller 11B extends to the arm base 6K side (arrow C side in FIG. 8) from the opening front edge 6BC-F without the position of the small roller 11B being too far from the opening 6BC (too far upward in FIG. 8). Naturally, the direction in which the mechanical winding device side wire 5A extends must be on the arm tip 6S side (arrow B side) from the opening rear edge 6BC-R, and the movement range of the mechanical winding device side wire 5A must be within the range of the opening 6BC.

In order to satisfy the conditions described in FIGS. 6 to 8, the distance L1 from the axis 11BC of the rotation shaft 11BS of the small roller 11B to the lower edge 12A of the roller support bracket 12 that supports the large roller 11A and small roller 11B is set to ensure that the roller support bracket 12 has the strength to reliably support the load acting on the small roller 11B, and the direction in which the mechanical winding device side wire 5A sandwiched between the large roller 11A and the small roller 11B extends must be on the arm base 6K side (arrow C side) of the opening front edge 6BC-F of the lower cover 6B, and on the arm tip 6S side (arrow B side) of the opening rear edge 6BC-R.

In the first embodiment, the distance L1 is set to a distance that ensures the strength of the roller support bracket 12 to reliably support the load acting on the small roller 11B. Also, the angle θ between the direction in which the mechanical winding device side wire 5A extends and the bottom surface 6BBS of the lower cover 6B is set to be 30° or more, for example, 45° or more. According to the inventor's experiment, by setting the angle θ in this way, the mechanical winding device side wire 5A does not interfere with the front edge 6BC-F of the opening 6BC, and the mechanical winding device side wire 5A does not approach or interfere with the rear edge 6BC-R of the opening. In other words, the mechanical winding device side wire 5A extends into the opening 6BC.

In the manner as explained with reference to FIGS. 2 to 8, the roller support bracket 12 can reliably support the load acting on the small roller 11B, and the mechanical winding device side wire 5A can be prevented from interfering with the opening 6BC of the lower cover 6B. Furthermore, rainwater is prevented from entering the support arm mechanism 6 (meets the waterproof grade of the IPX3 standard), and the problem that filling operation is disrupted due to malfunction of the support arm mechanism 6 is eliminated.

Next, the second embodiment of the present invention will be described with reference to FIGS. 9 and 10. In the second embodiment, a roller 111B corresponding to the small roller 11B in the first embodiment is configured to have a larger diameter than the small roller 11B. For example, if the diameter of the small roller 11B in the first embodiment is 12 mm, the diameter of the small roller 111B in the second embodiment is set to 18 mm. According to the inventor's experiment, if the diameter of the small roller 11B is small, the wire 5A is bent in a manner with a small radius of curvature at the point sandwiched between the large roller 11A and the small roller 11B. As a result, the wire 5A and the small roller 11B contact each other only at one point on the circumference of the small roller 11B, which may cause damage to the wire 5A. On the other hand, if the diameter of the small roller 111B is increased, as shown in FIG. 9, the wire 5A contacts the circumference of the small roller 111B not only at one point (not point contact) but over a certain length (area) to make line contact. Therefore, unlike in the case of point contact, the wire 5A is not damaged. In other words, the diameter of the small roller 111B is set to a dimension such that the wire 5A makes line contact with the circumference of the small roller 111B, not point contact.

As shown in FIG. 10, in the second embodiment, similarly to the first embodiment, the rotation shaft 111BS of the small roller 111B and the rotation shaft 11AS of the large roller 11A are supported by the roller support bracket 12. In FIG. 10, the roller support bracket 12 has four through holes, and the rotation shaft 11AS of the large roller 11A is inserted into through holes 12AH1 and 12AH2. Here, the through hole 12AH1 and a through hole 12BH1 are circular, but the through hole 12AH2 and a through hole 12BH2 are formed in a D-shape. The rotation shafts 11AS and 111BS have circular cross sections, but the cross sections of tip regions 11AS2 and 111BS2 are not circular, but have a shape (D-shape) complementary to the D-shaped through holes 12AH2 and 12BH2. During assembly, the rotation shaft 11AS is inserted into the through hole 12AH1, while the D-shaped tip region 11AS2 is inserted into the D-shaped through hole 12AH2. The rotation shaft 111BS is inserted into the through hole 12BH1, while the D-shaped tip region 111BS2 is inserted into the D-shaped through hole 12BH2. The rotation shaft 11AS does not rotate when the D-shaped tip region 11AS2 is inserted into the D-shaped through hole 12AH2, and the rotation shaft 111BS does not rotate when the D-shaped tip region 111BS2 is inserted into the D-shaped through hole 12BH2. Although not clearly shown, the large roller 11A is configured to rotate around the rotation shaft 11AS (so-called free rotation), and the small roller 111B is configured to rotate around the rotation shaft 111BS (free rotation).

A fitting groove is formed in each of the tip region 11AS2 having the D-shaped cross section of the rotation shaft 11AS inserted into the D-shaped through hole 12AH2, the other end 11AS1E of the rotation shaft 11AS, the tip region 111BS2 having the D-shaped cross section of the rotation shaft 111BS inserted into the D-shaped through hole 12BH2, and the other end 111BS1E of the rotation shaft 111BS, and the large roller 11A and the small roller 111B are attached to the bracket 12 by fitting the C-rings CA2, CA1, CB2, and CB1. When the rotation shafts 11AS and 111BS are fixed with low-head bolts (not shown in FIGS. 9 and 10), removing one of the low-head bolts causes the rotation shaft to spin freely, making it difficult to remove the rollers 11A and 111B because the other low-head bolt cannot be removed. On the other hand, as described above, if the rollers 11A, 111B are made rotatable about the rotation shafts 11AS, 111BS, and the rotation shafts 11AS, 111BS are not rotated, and the rotation shafts 11AS, 111BS are attached to the bracket 12 by engaging the C-rings CA2, CA1, CB2, CB1, the rollers 11A, 111B can be easily removed by disengaging the C-rings CA2, CB2. Also, installation of the rollers 11A, 111B is easy.

Although not clearly shown, in the second embodiment in FIGS. 9 and 10, the bending strength of the wire 5A is increased to prevent damage caused by bending the wire 5A at a small radius of curvature at the portion sandwiched between the large roller 11A and the small roller 11B. Specifically, the diameter of the strands constituting the wire 5A is reduced and the number of twists is increased. The other configurations and effects of the second embodiment shown in FIGS. 9 and 10 are the same as those of the first embodiment shown in FIGS. 2 to 8.

Next, the third embodiment will be described with reference to FIG. 11 and FIG. 12. In the third embodiment, instead of the small rollers 11B and 111B in the first and second embodiments, first and second shafts 42 and 44 having a circular cross section are provided. If the wire 5A moves upward (in the direction of the arrow U) of the support arm, there is a risk that the wire 5A will not pass through the opening 6BC properly. In FIG. 11, the first shaft 42 is provided above the wire 5A, thereby ensuring that the wire 5A passes through the opening 6BC properly, and the wire 5A is inserted and removed properly. In other words, the first shaft 42 is provided at a position that can prevent the wire 5A from moving upward. The first shaft 42 does not need to be rotatable, as it is only necessary to prevent the wire 5A from moving upward. On the other hand, the second shaft 44 has a function of guiding the wire 5A so that it does not interfere with the front edge 6BC-F (arrow B side edge) of the opening 6BC, and is configured to be rotatable. The second shaft 44 is provided at a position where the wire 5A can be guided to the opening 6BC and where the wire 5A does not interfere with the front edge portion 6BC-F.

In FIG. 12, the dimension of the opening 6BC of the lower cover 6B in the arrow W direction (the width of the opening 6BC) is set so that the wire 5A does not interfere with the side edge portion 6BC-S of the opening 6BC. The first and second shafts 42, 44 and the large roller 11A alone cannot restrict the movement of the wire 5A in the arrow W direction in FIG. 12, but by appropriately setting the dimension of the opening 6BC in the arrow W direction, it is possible to prevent interference between the wire 5A and the side edge portion 6BC-S of the opening 6BC. This makes it possible to prevent the paint of the lower cover 6B from peeling off, rusting, and damage to the wire 5A due to the interference. The other configurations and effects of the third embodiment in FIGS. 11 and 12 are the same as those of the embodiment in FIGS. 2 to 10.

The support arm mechanism 6 shown in FIG. 1 will be further described with reference to FIGS. 13 and 14. The support arm mechanism 6 has an upper cover 6A shown in FIG. 13 and a lower cover 6B shown in FIG. 14, and is configured by covering the lower cover 6B with the upper cover 6A. In the support arm mechanism 6 shown in FIGS. 13 and 14, the part on the side with a larger width is the base 6K, and the part on the opposite side of the base 6K with a smaller width is the tip 6S. In FIG. 13, a first bent part (projection) 6AA that protrudes downward (toward the lower cover 6B) is provided around the entire periphery of the upper cover 6A. Four screw holes H1 for attaching the lower cover 6B are formed on the periphery of the upper surface of the upper cover 6A shown in FIG. 13. Although not shown, in the prior art, in order to prevent liquid from entering the support arm, a cover body is fastened to the hollow structure with 11 screws via a seal material. In contrast, in the illustrated embodiment, the upper cover 6A is placed over the lower cover 6B and fastened together with four screws S, so that the labor required for assembly is extremely small.

The lower cover 6B shown in FIG. 14 has a second bent portion 6BA that protrudes upward around the entire periphery. The second bent portion 6BA has a total of six tall guide portions 6BB (fastening guide portions 6BB-1 and reinforcing guide portions 6BB-2) that are intermittently formed on the periphery. The upper end of the guide portion 6BB is a flat portion with a larger cross-sectional area than the other portions. When assembling the upper cover 6A and the lower cover 6B, the upper cover 6A is placed over the lower cover 6B so that the second bent portion 6BA of the lower cover 6B is positioned on the inner surface of the first bent portion 6AA of the upper cover 6A. As a result, the flat portion at the upper end of the guide portion 6BB abuts against the inner surface of the upper cover 6A and is positioned to support the upper cover 6A. Here, if the height of the second bent portion 6BA is made the same as that of the guide portion 6BB over the entire circumference of the edge of the lower cover 6B, the friction between the second bent portion 6BA and the first bent portion 6AA becomes too large, and there is a risk that the first bent portion 6AA will not fit into the second bent portion 6BA when the upper cover 6A is placed over the lower cover 6B. In addition, if the inclinations of the second bent portion 6BA and the first bent portion 6AA are different, it will be difficult to place the upper cover 6A over the lower cover 6B.

In an actual product, it is difficult to always perfectly align the relative positions of the first bent portion 6AA in the upper cover 6A and the second bent portion 6BA in the lower cover 6B. Therefore, in the illustrated embodiment, the second bent portion 6BA having the same height as the guide portion 6BB that reaches the upper cover when the upper cover 6A is placed on the lower cover 6B is not formed on the entire circumferential edge of the lower cover 6B. When the upper cover 6A is placed on the lower cover 6B, only the six guide portions 6BB (the fastening guide portions 6BB-1 and the reinforcing guide portions 6BB-2) that are provided intermittently in the circumferential direction of the lower cover 6B reach the upper cover. As a result, even if the inclinations of the second bent portion 6BA and the first bent portion 6AA differ slightly from design values, the upper cover 6A can be reliably and easily placed on the lower cover 6B and integrated.

The lower cover 6B is provided with a second bent portion 6BA formed around the entire circumference in the peripheral direction, and guide portions 6BB (fastening guide portions 6BB-1 and reinforcing guide portions 6BB-2) formed at six points intermittently in the peripheral direction. Since there is a recess between adjacent guide portions 6BB, the recessed portions become so-called "thin portions." Therefore, the lower cover 6B can be made lighter in weight than when the second bent portion 6BA, which is the same height as the guide portion 6BB, is formed on the circumferential front edge of the lower cover 6B.

In FIG. 14, of the six guide portions 6BB on the lower cover 6B, two guide portions 6BB-1 formed on the tip 6S side (left side in FIG. 14) of the support arm mechanism 6 and two guide portions 6BB-1 formed on the base 6K side (right side in FIG. 14) (four guide portions 6BB-1 in total: fastening guide portions) have screw holes H2 formed in their flat portions. On the other hand, in the region between the fastening guide portions 6BB-1 on the tip 6S side of the support arm mechanism 6 and the fastening guide portions 6BB-1 on the base 6K side of the support arm mechanism 6, two guide portions (reinforcement guide portions) 6BB-2 are located, but no screw holes H2 are formed in the flat portions of the reinforcing guide portions 6BB-2.

The screw holes H2 formed in the flat portions of the four fastening guide portions 6BB-1 are formed so as to align with the screw holes H1 formed in the upper cover 6A when the upper cover 6A is placed over the lower cover 6B, and the upper cover 6A is fixed in place over the lower cover 6B by fastening screws S into the screw holes H1 in the upper cover 6A and the screw holes H2 in the flat portions of the guide portions 6BB-1. In other words, the four fastening guide portions 6BB-1 on the tip 6S side and base 6K side of the support arm mechanism 6 in the lower cover 6B function as fastening members that fasten the upper cover 5A.

Since the reinforcing guide portion 6BB-2 does not have a screw hole, it does not contribute to fastening to the upper cover 6A. However, when an external force acts on the support arm mechanism 6 to bend in a direction perpendicular to the longitudinal direction (short direction), the moment of inertia at the location where the reinforcing guide portion 6BB-2 is provided becomes large, and the entire support arm mechanism 6 becomes difficult to bend. Therefore, the reinforcing guide portion 6BB-2 acts as a reinforcing member that makes the support arm mechanism 6 difficult to bend against the external force. In FIG. 14, a reference numeral 7 denotes a rotation shaft of the support arm mechanism 6, and the rotation shaft 7 and a bearing on the main body housing 2 allow the support arm mechanism 6 to rotate freely with respect to the main body housing 2.

As described above, the support arm mechanism 6 in the illustrated embodiment is configured by covering the lower cover 6B in FIG. 14 with the upper cover 6A in FIG. 13. This makes it possible to prevent rainwater from entering the inside of the support arm mechanism 6 with a simple configuration without providing a separate seal structure. The waterproof performance required for the support arm mechanism 6 of the gas filling device 1 according to the illustrated embodiment is such that, as described above in relation to FIG. 2, water is not allowed to enter when water is sprayed from above and when water is sprayed from the area between the vertical surface of the outer edge and the surface inclined at 60° to the hanging surface (standard IPX3: equivalent to level 3 of waterproof grade). According to the inventor's experiment, by covering the lower cover 6B with the upper cover 6A, waterproof performance that meets the waterproof grade of the standard IPX3 is exhibited. Furthermore, in the support arm mechanism 6 according to the illustrated embodiment, it is sufficient to cover the lower cover 6B with the upper cover 6A, and there is no need to screw the cover body around the entire circumference or use a sealant, so that assembly is easy, and weight reduction, miniaturization, and reduction in the number of parts can be achieved.

Next, a structure for supporting the support arm mechanism 6 rotatably relative to the main body housing 2 will be described with reference to FIGS. 15 and 16. In FIG. 15, a rotation shaft 7 for arm rotation is provided at the base 6K of the support arm mechanism 6. A bearing 20 for supporting the rotation shaft 7 is provided on the main body housing 2 side, and it is necessary to reliably prevent water from entering the bearing 20. In the illustrated embodiment, as shown in FIG. 16, a rising part 21 consisting of a cylindrical protrusion protruding upward (towards the support arm mechanism 6) is formed at the top 2A of the main body housing 2. As shown in FIG. 15, a cylindrical portion (hanging portion) 8 consisting of a cylindrical protrusion protruding downward is provided near the base 6K side of the support arm mechanism 6. The internal space of the cylindrical portion 8 is in communication with an opening 7A in which the rotation shaft 7 is disposed. The cylindrical portion 8 is configured to cover the rising part 21 from above, and the rising part 21 is concentrically disposed on the inner surface of the cylindrical portion 8. Although not clearly shown, the dimension by which the rising part 21 (FIG. 15) protrudes upward is set to be, for example, 300% to 350% higher than the dimension by which a similar member in an existing gas filling device protrudes.

With this configuration, even if water is sprayed from the area above the support arm mechanism 6 and the area between the vertical plane and the plane inclined at 60 degrees from the vertical plane (even if water is sprayed in a manner similar to that of the IPX3 standard, waterproofing level 3), water is prevented from seeping in beyond the cylindrical portion 8 and the rising part 21 and reaching the bearing 20 located radially inward. The above-mentioned effect was confirmed by experiments conducted by the inventor.

In FIG. 17 showing the internal structure of the support arm mechanism 6, for the sake of simplicity, the upper cover 6A is omitted and the lower cover 6B and its internal structure are shown. The base 6K side (right side in FIG. 17) of the support arm mechanism 6 is the side that is rotatably arranged on the main body housing 2 (not shown in FIG. 17), and the rotation shaft 7 and so on are provided. The tip 6S side (left side in FIG. 17) of the support arm mechanism 6 is the side where the wire 5B connected to the filling nozzle 4 hangs down, and the rollers 11, 111, the shafts 42, 44 and so on are provided. The configurations and functions of the rollers 11, 111, the shafts 42, 44 are as described with reference to FIG. 2 to FIG. 12. The support arm mechanism 6 according to the illustrated embodiment does not expand and contract in the longitudinal direction itself. The support arm mechanism 6 according to the illustrated embodiment is not of a "nested" configuration having an arm body and a payout arm, but is of a configuration that prioritizes small size and light weight.

Inside the base 6K side of the support arm mechanism 6, a mechanical winding device 9 is provided for unwinding and winding the wire 5. The mechanical winding device 9 is a known mechanism for winding the wire 5 by mechanical power such as a spring. Although not shown, the mechanical winding device 9 in the illustrated embodiment is smaller and lighter than a mechanical winding device provided in an existing gas filling device. In the vicinity of the mechanical winding device 9, the mechanical winding device side wire 5A (the wire unwound from the mechanical winding device 9) is connected by a first connecting part (e.g., a carabiner) 10A. The mechanical winding device side wire 5A and the filling nozzle side wire 5B (the wire supporting the filling nozzle 4) are connected by a second connecting part 10B (e.g., a wire coupling). The filling nozzle 4 and the filling nozzle side wire 5B are connected by a third connecting part (e.g., a carabiner) 10C. In the illustrated embodiment, a buffer rubber 14, a stopper 15, etc. are interposed on the wire 5A on the mechanical winding device side.

With the above configuration, when replacing the members shown in FIG. 18 described below (members interposed between the first connecting part 10A and second connecting part 10B, such as the mechanical winding device side wire 5A, buffer rubber 14, and stopper 15), the connection between the first connecting part 10A and second connecting part 10B can be released and only the members that need to be replaced can be replaced, without the need to remove members that do not need to be replaced (such as the mechanical winding device 9, roller 11, filling nozzle side wire 5B, filling nozzle 4, etc.). This makes part replacement easy.

Although not shown in FIG. 17, in the illustrated embodiment, the mechanical winding device side wire 5A and the filling nozzle side wire 5B are coated with a synthetic resin (e.g., polyamide) to provide good sliding properties. Therefore, the mechanical winding device side wire 5A is smoothly pulled out and wound, and wear of the roller 11 is prevented. In addition, in the illustrated embodiment, when the third connecting part 10C is configured with a carabiner, the carabiner is preferably not a type that opens outward, but a type that opens inward. If the carabiner is a type that opens outward, when the carabiner opens outward for some reason, the filling nozzle 4 may fall to the ground from the outward opening and be damaged. On the other hand, if the carabiner is a type that opens inward, even if the carabiner opens for some reason, the possibility that the filling nozzle 4 will come off from the carabiner that opens inward is extremely low, and the possibility that the filling nozzle 4 will fall to the ground and be damaged is reduced.

The arrangement of the wires in FIG. 17 is schematically shown in FIG. 18. In FIG. 18, the mechanical winding device side wire 5A is provided with a member for buffering the tension acting when an FCV vehicle erroneously starts or the filling nozzle 4 falls, and for buffering the force generated by other factors. A buffer rubber 14 and a stopper 15 are interposed near the first connecting part 10A connected to the mechanical winding device 9 on the base 6K side of the support arm mechanism 6, and a washer 16 is interposed between them. A stopper 15 and a washer 16 are also interposed near the roller 11 on the tip 6S side of the support arm mechanism 6. The washer 16 is provided to reduce the impact between the buffer rubber 14 and the stopper 15 when an impact (compression) acts on the buffer rubber 14 due to an erroneous start of an FCV or when the mechanical winding device side wire 5A is wound around the mechanical winding device 9, thereby extending the life of the buffer rubber 14.

Arranging the buffer rubber 14, the stopper 15, and the washer 16 enables to cushion the impact (force acting in the direction of the arrow A or the arrow B in FIG. 18 and FIG. 17) received by the gas filling device 1. The above-mentioned configuration is also effective in cushioning when an external force acts due to a factor other than the above. Furthermore, for example, an emergency release mechanism (wire coupling) may be provided in the second connecting part 10B (FIG. 17), and when the filling nozzle 4 is pulled with a force of a predetermined value or more, the emergency release mechanism separates to release the connection, and the connection between the second connecting part 10B and the mechanical winding device side wire 5A may be released.

A rotation restricting means for restricting the rotation of the rotation shaft of the support arm mechanism 6 will be described with reference to FIG. 19. A rotation restricting means 22 is provided below the rotation shaft 7 of the support arm mechanism 6. The rotation restricting means 22 includes a protruding piece 23 and a stopper 24. The protruding piece 23 is connected to the rotation shaft 7 of the support arm mechanism 6 and rotates integrally with the rotation shaft 7. The stopper 24 is disposed on the upper surface of the main body housing 2. Two roughly semicircular connecting members 25 are fixed to the rotation shaft 7 with bolts BT. The connecting members 25 are connected to a lower disc 26, and a protruding piece 23 extending radially outward is fixed to the upper surface of the lower disc 26. With this configuration, the lower disc 26 rotates integrally with the rotation shaft 7 of the support arm mechanism 6. Meanwhile, a single cylindrical stopper 24 is fixed to the upper surface of the main body housing 2.

When the protruding piece 23, which rotates integrally with the rotation shaft 7, comes into contact with the stopper 24, the rotation of the support arm mechanism 6 is restricted. In the illustrated embodiment, a single stopper 24 is provided, and thus the range of rotation of the support arm mechanism 6 is wider than when multiple (e.g., two) stoppers are provided. Therefore, it is possible to accommodate cases where the filling nozzle (nozzle hook) is located on the front, rear, or side of the gas filling device 1.

It should be noted that the illustrated embodiment is merely an example and is not intended to limit the technical scope of the present invention.

EXPLANATION OF SYMBOLS

1 gas filling device
2 main body housing
3 filling hose
4 filling nozzle
5 wire
5A mechanical winding device side wire
5B filling nozzle side wire
6 support arm mechanism
6A upper cover
6AA first bent portion
6B lower cover
6BA second bent portion
6BB guide
6BB-1 fastening guide
6BB-2 reinforcement guide
6BBS bottom of lower cover
6BC opening (opening of lower cover)
6BC-F front edge of opening
6BC-R rear edge of opening
7 rotation shaft
7A opening
8 cylindrical part
9 mechanical winding device (retractor)
10B connection member (carabiner)
11 roller
11A large roller (reeling roller)
11AA large roller side edge protrusion
11AB V-shaped groove
11AS rotation axis of large roller
11B, 111B small rollers (holding rollers)
11BS, 111BS rotation axes of small rollers
11BC center of support roller
12 roller support bracket
12A lower edge of roller support bracket
21 rising part
L1 distance from the rotation center of the small roller to the lower edge of the roller support bracket
42 first shaft
44 second shaft

The invention claimed is:

1. A gas filling device comprising:
a filling mechanism for transporting gas from a gas supply source through a gas pipe;
a main body housing having the filling mechanism therein;
a filling hose connected to an outlet of the gas pipe of the filling mechanism;
a support arm mechanism for supporting, via a wire, a filling nozzle provided at a tip of the filling hose:
a mechanical winding device provided at an end of the support arm mechanism; and
a guide provided at another end of the support arm mechanism for guiding a wire led out from the mechanical winding device to an opening formed in a lower cover of the support arm mechanism
wherein said guide is provided with a reeling roller that sends the wire from the mechanical winding device to an opening, and a holding roller that restricts the wire from moving upward, and the wire is sandwiched between the reeling roller and the holding roller,
wherein said reeling roller and holding roller are supported by a roller holding bracket, and a distance from an axis of a rotation shaft of the holding roller to a lower edge of the roller support bracket is a distance that ensures a strength required for the roller support bracket to reliably support a load acting on the holding roller.

2. The gas filling device as claimed in claim 1, wherein a direction in which the wire sandwiched between the reeling roller and holding roller extends is an area between a front edge and a rear edge of the opening.

3. The gas filling device as claimed in claim 1, wherein an outer surface of the reeling roller is formed a step protruding outward.

4. The gas filling device as claimed in claim 1, wherein said mechanical winding device is provided inside the support arm mechanism, and the wire led out from the mechanical winding device and the wire that supports the filling nozzle are connected with a connection member.

5. The gas filling device as claimed in claim 1, wherein a diameter of the holding roller is set to a dimension in which the wire and an arc of an outer periphery of the holding roller make line contact without point contact.

6. A gas filling device comprising:
a filling mechanism for transporting gas from a gas supply source through a gas pipe;

a main body housing having the filling mechanism therein;

a filling hose connected to an outlet of the gas pipe of the filling mechanism;

a support arm mechanism for supporting, via a wire, a filling nozzle provided at a tip of the filling hose:

a mechanical winding device provided at an end of the support arm mechanism; and a guide provided at another end of the support arm mechanism for guiding a wire led out from the mechanical winding device to an opening formed in a lower cover of the support arm mechanism, wherein said guide is provided with a reeling roller that sends the wire from the mechanical winding device to the opening, a first shaft that is provided at a position that prevents the wire from moving upward, and a second shaft that is provided at a position that can guide the wire to the opening and does not cause the wire to interfere with a front edge of the opening.

7. The gas filling device as claimed in claim 2, wherein an outer surface of the reeling roller is formed a step protruding outward.

8. The gas filling device as claimed in claim 2, wherein said mechanical winding device is provided inside the support arm mechanism, and the wire led out from the mechanical winding device and the wire that supports the filling nozzle are connected with a connection member.

* * * * *